(12) United States Patent
Aoyama et al.

(10) Patent No.: US 6,287,530 B1
(45) Date of Patent: Sep. 11, 2001

(54) SYNTHETIC RESIN ADDITIVE AND SYNTHETIC RESIN COMPOSITION CONTAINING PARTICLES OF POROUS HYDROXYAPATITE

(75) Inventors: Mitsunobu Aoyama; Shigeo Takiyama; Hidehiko Nishioka; Shiro Minayoshi, all of Hyogo (JP)

(73) Assignee: Maruo Calcium Company Ltd., Akashi (JP)

(*) Notice: Subject to any disclaimer, the term of this patent is extended or adjusted under 35 U.S.C. 154(b) by 0 days.

(21) Appl. No.: 09/331,787

(22) PCT Filed: Dec. 24, 1997

(86) PCT No.: PCT/JP97/04805

§ 371 Date: Jun. 25, 1999

§ 102(e) Date: Jun. 25, 1999

(87) PCT Pub. No.: WO98/29490

PCT Pub. Date: Jul. 9, 1998

(30) Foreign Application Priority Data

Dec. 27, 1996 (JP) .................................................. 8-357888

(51) Int. Cl.[7] ...................................................... B32B 5/16
(52) U.S. Cl. ......................... 423/308; 423/311; 428/330; 428/402; 521/218
(58) Field of Search .................................. 423/308, 311; 428/402, 330; 521/218

(56) References Cited

U.S. PATENT DOCUMENTS

| | | | |
|---|---|---|---|
| 4,629,464 | * 12/1986 | Takata et al. | 623/16 |
| 5,158,756 | * 10/1992 | Ogawa et al. | 423/309 |
| 5,690,908 | * 11/1997 | Deutsch et al. | 424/9.32 |
| 5,702,677 | * 12/1997 | Shimp et al. | 423/308 |
| 5,844,022 | * 12/1998 | Nishioka et al. | 523/218 |
| 5,976,687 | * 11/1999 | Nishioka et al. | 428/323 |
| 6,033,780 | * 3/2000 | Nishioka et al. | 428/402 |

FOREIGN PATENT DOCUMENTS

| | | |
|---|---|---|
| 7-2505 | 1/1995 | (JP) . |
| 7-196314 | 8/1995 | (JP) . |
| 9-25108 | 1/1997 | (JP) . |
| 9-40408 | 2/1997 | (JP) . |

* cited by examiner

Primary Examiner—Hoa T. Le
(74) Attorney, Agent, or Firm—Armstrong, Westerman, Hattori, McLeland & Naughton, LLP

(57) ABSTRACT

An additive for synthetic resins is provided which comprises particles of a petaloid hydroxyapatite represented by a chemical formula $Ca_{10}(PO_4)_6(OH)_2$, having the specified particle diameter, degree of dispersion: and specific surface area, and a synthetic resin composition blended with the additive is also provided. By the use of the additive of the present invention, a film satisfying anti-blocking property, transparency and anti-scratch property can be obtained.

9 Claims, 5 Drawing Sheets

SYNTHETIC RESIN ADDITIVE AND SYNTHETIC RESIN COMPOSITION CONTAINING PARTICLES OF POROUS HYDROXYAPATITE

TECHNICAL FIELD

The present invention relates to an additive for synthetic resins comprising particles of a specific form of petaloid porous hydroxyapatite, and a synthetic resin composition blended with this additive. The purpose of the present invention is to provide an additive for synthetic resins being capable of giving a synthetic resin film excellent in anti-scratch property and anti-blocking property, a synthetic resin fiber excellent in dyeability, and a synthetic resin composition excellent in transparency, and a synthetic resin composition blended therewith.

BACKGROUND ART

Synthetic resins are widely used in various industrial fields. Among the synthetic resins, an industrially manufactured polyester, especially polyethyleneterephthalate (hereinafter referred to as PET) has superior physical and chemical characteristics and is used as fibers, films, and other molded articles. For example, in a film area, the polyester is used for magnetic tapes such as audiotapes and videotapes, condensers, photographs, wrappings, OHP, prepaid cards and so on. In the polyester film, slipperiness and anti-shavingness are main elements that control workability in a manufacturing step or a processing step of the film in various uses, and a quality of a product. In a case where a magnet layer is coated on a surface of the polyester film so as to use as a magnetic tape, if the slipperiness and anti-shavingness of the film are not sufficient, a friction between coating rolls and the surface of the film becomes large, thereby causing a severe abrasion of the surface of the film, and in an extreme case, resulting in wrinkles and scratches on the surface of the film. Even after processing the film into a tape such as audiotapes, videotapes and computer-tapes by slitting the film which is coated with the magnetic layer, an extreme friction between the surface of the film and many guides or a reproduction head will occur during operations such as drawing out of the tape from a reel or cassette, winding the tape and so on. This extreme friction causes scratches or strain, and the shaving of the surface of the polyester film deposits white powder, and results in a lack of magnetic recording signal, namely, drop-out.

For lowering a friction coefficient of the polyester, many methods for improving slipperiness of the surface of the molded articles are proposed by incorporating inorganic fine particles into polyester so as to give minute and appropriate roughness to the surface of the molded articles of the polyester. However, since affinity between the fine particles and the polyester is not sufficient, both transparency and anti-abrasion property of the film are not satisfactory.

In case of a polyolefin, the polyolefin is widely used in various industrial fields. Especially, a polyolefin film such as a polypropylene film is the most widely used as various wrapping materials. Since it is known that such kind of the polyolefin film is adhesive, the polyolefin film tends to cause blocking. For this reason, workability in a process for manufacturing or processing of the film becomes worse. Furthermore, in a case where the film is used in packaging or wrapping, troubles such as less workability in opening the package or wrapping tend to occur. Therefore, in general, an anti-blocking treatment is done on this kind of film. As an anti-blocking agent, a finely powdered silicic acid, zeolite, calcium carbonate and kaolin clay are typically known and used.

On the other hand, the polyolefin film requires, as qualitative characterics, superior transparency and good anti-scratch property (For example, the surface of the film is less scratched when the surfaces of the films are contacted with each other.). However, the transparency and the anti-scratch property are contrary to the anti-blocking property. For example, in order to improve the anti-blocking property of the polyolefin film, if a large amount of the anti-blocking agent is used, the anti-scratch property and the transparency become poorer as an amount of the anti-blocking agent to be added is increased. Therefore, as the additive to improve the anti-blocking property, the anti-scratch property and the transparency of the film to a satisfactory level, the conventional inorganic powder was far from satisfaction.

In case of the conventional kaolin clay, since the particle shape of the kaolin clay has a plate-like structure, when it is used as an anti-blocking agent of the polyolefin film, it can not form roughness on the surface of the polyolefin film in a satisfactory level. Therefore, a large amount of kaolin clay is required to obtain a satisfactory level of anti-blocking property. As a result, only polyolefin film having insufficient transparency could have been obtained.

In case of the finely powdered silicic acid, since the main particles of the silicic acid is extremely minute, a polyolefin film with a satisfactory level of transparency and anti-scratch property can be obtained. However, since the silicic acid cannot form sufficient roughness on the surface of the polyolefin film, a polyolefin film having a satisfactory level of anti-blocking property could not have been obtained even though a large amount of silicic acid was used.

In case of the powdered zeolite, a polyolefin film that has good transparency and anti-blocking property can be obtained when compared to a film containing the kaolin clay or the finely powdered silicic acid. However, a film with good anti-scratch property cannot be obtained. Moreover, since the zeolite is known to have crystalline water, it may cause defective products due to bubbling formed by the crystalline water which is released from the zeolite by heating in a process of molding a synthetic resin or making a film. If the zeolite is heated to remove so called zeolite water so as to make an activated zeolite which does not have crystalline water, it readsorbs water easily. Therefore, it is substantially impossible to remove an influence of the water in a process for film formation.

Furthermore, in case of the calcium carbonate, since the calcium carbonate does not have crystalline water, there is no bubbling due to a release of the crystalline water. However, since the calcium carbonate inherently has a strong aggregation tendency, the calcium carbonate tends to form secondary large particles which are formed by aggregation of many primary particles. Therefore, the calcium carbonate has problems to be solved as a good anti-blocking agent for a polyolefin film with a good anti-blocking property, transparency and anti-scratch property.

Moreover, in case of a synthetic fiber, it is considered to improve dyeability of a polyester fiber which is difficult to dye that roughness is formed on the surface of fiber. However, when importance is attached to the dyeability, the strength of a fiber itself lowers to thereby damage excellent properties inherent to the polyester fiber.

In view of the above facts, after extensive and intensive studies on an additive for synthetic resins which can give a good anti-blocking property, good transparency and good anti-scratch property to synthetic resins represented by polyesters or polyolefins, especially a film or a fiber thereof and which has a good affinity to the synthetic resin, and further on a synthetic resin composition containing the additive, the present inventors have found out that particles of petaloid porous hydroxyapatite having a specific particle composition, specific particle diameter and degree of dispersion thereof and specific surface area have functions as the intended additive for synthetic resins, and that a synthetic resin composition blended with this additive can attain the intended purpose, and thus accomplished the present invention.

DISCLOSURE OF INVENTION

The present invention is, in a first aspect, directed to an additive for synthetic resins which comprises particles of petaloid porous hydroxyapatite represented by a chemical formula $Ca_{10}(PO_4)_6(OH)_2$, said particles satisfying the following formulas (a)–(d):

$$0.1 \leq dx1 \leq 20(\mu m) \quad (a)$$

$$1 \leq \alpha \leq 2, \text{ where } \alpha = d50/dx1 \quad (b)$$

$$0 \leq \beta \leq 1.7, \text{ where } \beta = (d90-d10)/d50, \quad (c)$$

and $$50 \leq Sw1 \leq 400 \quad (d)$$

wherein,
- dx1: Average particle diameter ($\mu$m) measured by a photograph of an electron microscope;
- $\alpha$: Dispersion coefficient;
- d50: 50% average particle diameter ($\mu$m) measured by a particle size distribution tester using a microtrack FRA laser;
- $\beta$: Sharpness;
- d90: 90% particle diameter of the total particles passed through a sieve measured by a particle size distribution tester using a microtrack FRA laser;
- d10: 10% particle diameter of the total particles passed through a sieve measured by a particle size distribution tester using a microtrack FRA laser;
- Sw1: BET specific surface area m$^2$/g by a nitrogen adsorbing method.

The present invention is, in a second aspect, directed to a synthetic resin composition which comprises blending a synthetic fiber with the above-mentioned additive.

BEST MODE FOR CARRYING OUT THE INVENTION

Figure 1:
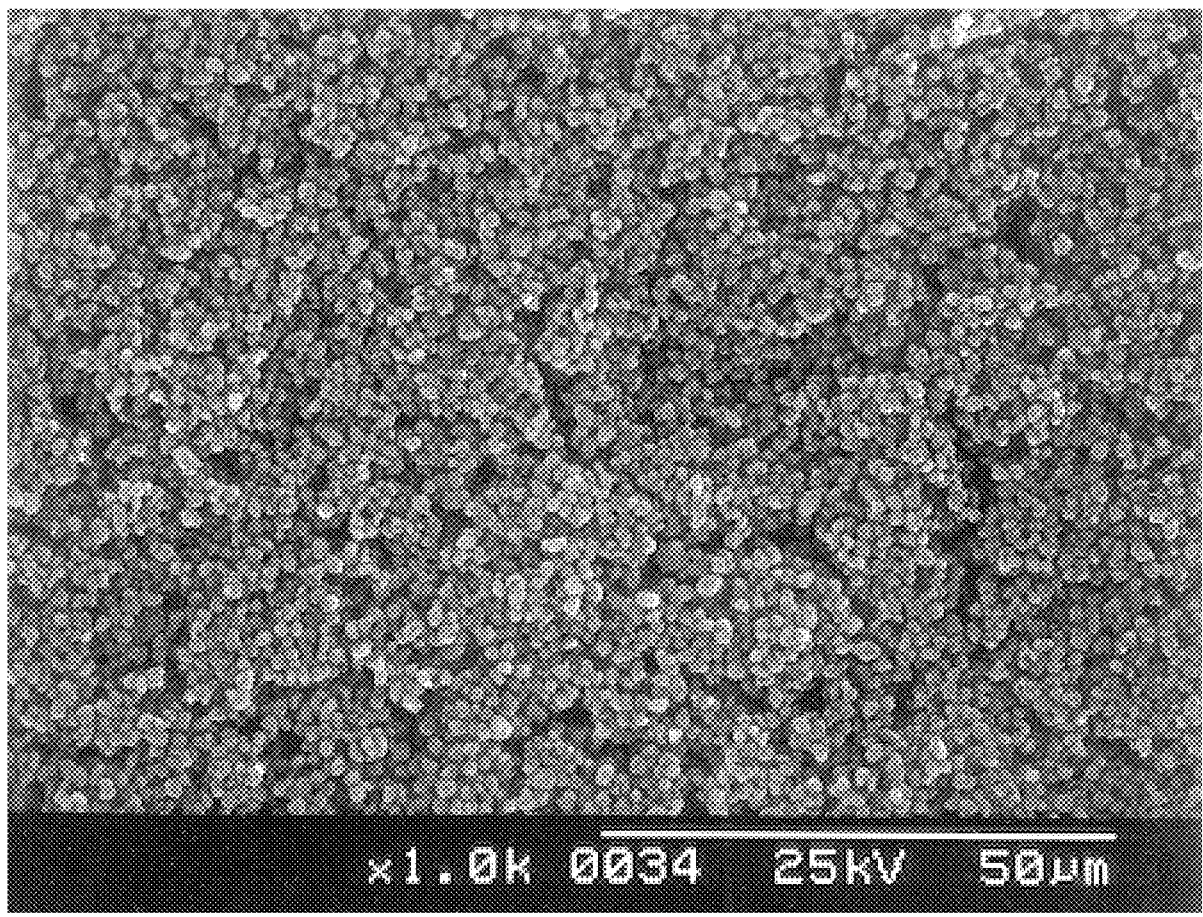
FIG. 1 is a photograph of an electron microscope (×1000 magnification) showing a particle structure of particles A.

The most important feature of the additive for synthetic resins of the present invention is that it comprises particles of petaloid porous hydroxyapatite, not merely hydroxyapatite.

The additive for synthetic resins (hereinafter, sometimes referred to as additive) comprises petaloid porous hydroxyapatite and its petaloid structure has self-breakability. The self-breakability is defined as a characteristic as follows:when a stress is given from outside, the particle itself can absorb or disperse the stress by destroying or breaking and deforming a part of the particle, thereby decreasing a repulsive force from the particle against the stress from the outside. Therefore, for example, even in a case where the additive of the present invention is added to a synthetic resin film in a large amount and the thus obtained films are contacted with each other, since the particles of the petaloid structure which exist on the surface of the film can self-break down to thus largely decrease the stress caused by the contact of the films, the degree of abrasion of the surface of the film can be remarkably decreased as compared to a case where other additives for synthetic resins that do not have self-breakability are used. As a result, the synthetic resin film having a good anti-scratch property can be obtained.

The additive of the present invention, different from petaloid porous hydroxyapatite coated particles which were applied for as Japanese Patent Application No. 7-200504 but not yet laid-open, comprises a petaloid porous hydroxyapatite in the whole of the particle and thus exhibits such self-breakability more remarkably to thus provide films more excellent in anti-blocking property, anti-scratch property and transparency.

Moreover, since the additive of the present invention is comprised of porous hydroxyapatite of the petaloid structure having a large specific surface area, the additive has a good affinity to synthetic resins such as polyesters and polyolefins so that it is possible to prepare a synthetic resin with a good transparency. Furthermore, when the additive of the present invention is used, for example, as an anti-blocking agent of films and so on, it is possible to obtain a synthetic resin film from which dropping out of the additive particles is extremely reduced.

Moreover, the additive of the present invention has a high specific surface area and a high percentage of void and thus an apparent specific gravity of the particles is low. Therefore, when the additive is added in the same volume amount as required to exhibit a sufficient anti-blocking property in the case of the conventional additives, the weight added of the additive becomes small as compared with the conventional additives, i.e., the addition in a smaller amount gives an excellent anti-blocking property. Furthermore, the particles are uniform in particle size and they are buried in a resin to thus reduce the proportion of the particles not taking part in the anti-blocking property. As a result, with a small amount a synthetic resin composition having a good anti-blocking property is obtained. Moreover, a synthetic resin having a good anti-blocking property with a small amount is also improved in transparency.

Furthermore, the additive of the present invention is comprised of particles having excellent adsorbing and retention properties as well as high specific surface area and percentage of void and thus it imparts an excellent dyeability to, for example, a polyester fiber which is difficult to dye. In addition, since the particles are uniform in particle size, there is no problems such as breakage of a fiber caused by coarse particles.

The additive for synthetic resins of the present invention comprises particles of hydroxyapatite having a petaloid porous structure represented by a formula $Ca_{10}(PO_4)_6(OH)_2$ and the dx1 of the particles is $0.1 \leq dx1 \leq 20(\mu m)$, preferably, $0.2 \leq dx1 \leq 10(\mu m)$, and more preferable, $0.5 \leq dx1 \leq 8(\mu m)$.

If dx1 is less than 0.1 μm, the dispersion of the additive in the synthetic resin is not easy, and furthermore, the sufficient anti-blocking property can not be revealed when the additive is used in, for example, a synthetic resin fiber or film. If dx1 is more than 20 μm, not only is the transparency of the synthetic resin damaged, but also there causes a tear of the fiber or coarse protrusions when used in, for example, a synthetic fiber resin or film.

The α and β of the additive satisfy $1 \leq \alpha \leq 2.0$ and $1 \leq \beta \leq 1.7$, respectively, and preferably, $1 \leq \alpha \leq 1.5$ and $0 \leq \beta \leq 1.0$. If α is more than 2, it is not preferable in view of a design of a performance of molded articles of synthetic resins. For example, in a field of film, since a size of concavo-convex of the surface of the film obtained by addition of such an additive becomes uneven, a film having a sufficient anti-blocking property can not be obtained. Especially, in a field of magnetic tapes such as audiotapes and videotapes where higher physical properties are required, a value of α being not more than 1.5 is more preferable. If α is less than 1, the particles aggregate and become uneven.

When β, which is a function of a particle size composition of the additive, is over 1.7, a width of the particle size distribution becomes broad so that contents of unnecessary fine particles for synthetic resin compositions and coarse particles which cause coarse protrusions of the surface of the synthetic resin molded articles such as film become high. Therefore, the additive that can give a sufficient anti-blocking property and good transparency to the synthetic resin molded articles such as synthetic resin films can not be obtained.

The Sw1 of the additive of the present invention satisfies $50 \leq Sw1 \leq 400$, preferably $100 \leq Sw1 \leq 350$.

In case where Sw1 is less than 50, affinity between the additive and the synthetic resin is not sufficient. Therefore, transparency of the synthetic resin can be damaged, and undesirable drop-out of the additive occurs when the additive is used in a film, fiber and so on. Furthermore, since the self-breakability of the additive is insufficient, a synthetic resin composition with a good anti-scratch property can not be obtained. In case where Sw1 is more than 400, the self-breakability of the additive becomes excess. Therefore, when used in a film or fiber and so on, the anti-scratch property of the synthetic resin composition becomes good, but the synthetic resin composition with a good anti-blocking property can not be obtained.

Furthermore, for example, in a process for manufacturing a polyester, when the polyester is polymerized by suspending an additive having Sw1 of more than 400 into ethylene glycol, since the additive has a large surface area and high activity, the additive itself aggregates to form coarse particles in the polymerization process, or coarse organic particles can be formed by calcium ion generated from the additive itself, and thus it is undesirable.

The petaloid structure of the additive of the present invention is not limited in particular, as far as the petaloid structure like a flower of rose can be observed on the surface of the additive by an electron microscope photograph observation. However, in order to obtain an additive with a sufficient self-breakability and to obtain a synthetic resin composition with a sufficient anti-scratch property with a small amount added, it is preferable that dx2, ω1 and ω2 satisfy the followings:

$0.01 \leq dx2 \leq 1 (\mu m)$, $90 \leq \omega 1 \leq 99$ and $60 \leq \omega 2 \leq 95$, more preferably, $0.01 \leq dx2 \leq 1 (\mu m)$, $95 \leq \omega 1 \leq 99$ and $70 \leq \omega 2 \leq 95$, wherein, dx2, ω1 and ω2 represent the followings:

dx2: an average micropore diameter (μm) of particles measured from a distribution of the micropore measured by a mercury penetration method;

ω1: a static percentage of voids (%) calculated from the following equation (m):

$$\omega 1 = \left\{ 1 - \frac{1}{2.9 \times [\text{apparent specific volume}]} \right\} \times 100(\%) \quad (m)$$

wherein the apparent specific volume (ml/g) is measured according to a static method of pigment test of JIS K5101-91 20.1;

ω2: a pressurized percentage of voids (%) calculated from the following equation (n):

$$\omega 2 = \left\{ 1 - \frac{0.5}{2.9 \times 2 \times [\text{thickness}]} \right\} \times 100(\%) \quad (n)$$

wherein the thickness is measured by a slide calipers after packing 0.5 g of a sample in a cylinder having a cross section of 2 cm$^2$, pressurizing the sample with a pressure of 30 kg/cm$^2$ for 30 seconds.

The additive for synthetic resins can be prepared by mixing in water an aqueous suspension dispersion of calcium carbonate and a dilute aqueous solution of phosphoric acid so that an atomic ratio Ca/P is from 1.62 to 1.72 under specific mixing conditions as set forth below, followed by aging under specific aging conditions as set forth below and drying under a drying atmosphere at 700° C. or less with or without dehydration prior to drying, then grinding.

Mixing Conditions:

Solid concentration of the aqueous suspension of calcium carbonate: 1–15%;

Phosphoric acid concentration of the dilute aqueous solution: 1–50%;

Peripheral speed of a stirring blade; 0.5–50 m/sec;

Mixing time: 0.1–150 hours;

Temperature of the aqueous suspension liquid: 0–80° C.; and pH of the aqueous suspension liquid: 5–9.

Aging conditions:

Calcium concentration: 0.4–5%;

Aging time: 0.1–100 hours;

Temperature of the aqueous suspension liquid: 20–80° C.;

pH of the aqueous suspension liquid: 6–9; and

Peripheral speed of a stirring blade: 0.5–50 m/sec.

Synthetic resins and synthetic resin molded articles with which the additive for synthetic resins of the present invention are blended are not specifically limited. As thermoplastic resins, polyethylene, polypropylene, polystyrene, polyvinyl acetate, polyacrylate, polyacrylamide, polyester, polyacrylonitrile, polyamide, polyvinyl chloride, polyvinylidene chloride and so on are exemplified. As thermosetting resins, phenolic resin, epoxy resin, unsaturated polyester resin, alkyd resin, urea resin, melamine resin, urethane resin, silicone resin and so on are exemplified. Among them, the additive of the present invention is especially applicable to a film composition and a fiber composition made from the polyolefin or saturated polyester.

The polyolefin is not limited as far as the polyolefin has ability to form a transparent and crystalline self-supporting film. As the polyolefin, crystalline homopolymers of α-olefins having carbon number of 2–12 or crystalline copolymers of two or more kinds thereof, are exemplified. For example, polyethylene, polypropylene, poly-4-methylpentene-1, ethylene-propylene random or block copolymers, ethylene-propylene-butene terpolymers and ethylene-propylene-hexene terpolymers are exemplified. Among them, the polypropylene or copolymers of propylene containing 50% by weight or more of propylene and the other α-olefins is preferable. Especially, a propylene polymer containing 0–6% by weight of ethylene is preferable.

Those polyolefins are crystalline and have isotactic index (II) of 40 or more, preferably, 60 or more, and most preferably, 90 or more. Further, they are usable as far as they can be molded. Usually, polyolefins have preferably a melt flow rate (MFR) of 0.01–100 g/10 min., more preferably 0.1–50 g/10 min., most preferably 0.5–10 g/10 min.

As the polyester, there is no limitation as far as the polyester has aromatic dicarboxylic acid as its main acid component and aliphatic glycol as its main glycolic component. Such polyesters are substantially linear and have a film forming ability, especially, by melt molding. As the aromatic dicarboxylic acid, for example, terephthalic acid, naphthalenedicaboxylic acid, isophthalic acid, diphenylethanedicarboxylic acid, diphenyldicarboxylic acid, diphenyletherdicarboxylic acid, diphenylsulfonedicarboxylic acid, diphenylketonedicarboxylic acid and anthracenedicarboxylic acid are exemplified.

As the aliphatic glycol, for example, polymethylene glycols having a carbon number of 2–10, such as ethylene glycol, trimethylene glycol, tetramethylene glycol, pentamethylene glycol, hexamethylene glycol and decamethylene glycol, or alicyclic diols such as cyclohexanedimethanol are exemplified.

In the present invention, polyesters having, for example, alkyleneterephthalate and/or alkylenenaphthalate as its main component are preferably used. Among such polyesters, not only polyethyleneterephthalate or polyethylene-2,6-naphthalate, but also copolymers comprising, for example, 80 mol % or more of the total dicarboxylic acid component being terephthalic acid and/or 2,6-naphthalenedicaboxylic acid and 80 mol % or more of the total glycol component being ethylene glycol are preferable.

In this case, 20 mol % or less of the total acid component can be above aromatic dicarboxylic acids excluding terephthalic acid and/or naphthalenedicarboxylic acid, aliphatic dicarboxylic acids such as adipic acid and sebacic acid, and alicyclic dicarboxylic acids such as cyclohexane-1,4-dicarboxylic acid. Also, 20 mol % or less of the total glycol component can be above glycols excluding ethylene glycol, aromatic diols such as hydroquinone and 2,2-bis(4-hydoxyphenyl) propane, aliphatic diols containing aromatics such as 1,4-dihydroxymethylbenzene, polyalkylene glycols (polyoxyalkylene glycols) such as polyethylene glycol, polypropylene glycol and polyteramethylene glycol, and so on.

Furthermore, the saturated polyester includes polymers in which an oxycarboxylic acid component derived from aromatic oxy acid such as hydroxybenzoic acid and aliphatic oxy acid such as ω-hydroxycaplic acid was copolymerized or bound in an amount of not more than 20 mol % with respect to the total amount of the dicarboxylic acid component and the oxycarboxylic acid component.

Moreover, this polyester includes a copolymerized polymer of a polycarboxylic acid or a polyhydroxy compound having 3 or more functional groups such as trimellitic acid, pentaerythritol in an amount of maintaining a substantially linear range, for example, in an amount of not more than 2 mol % of the total acidic component.

Other synthetic resins such as polyamides including Nylon 66 and Nylon 6 or halogen-containing polymers such as polyvinyl chloride can be applicable.

An amount of particles of the additive of the present invention to be added to the synthetic resin is not uniformly determined according to the use of the resin. In a case where the additive is used as an anti-blocking agent of the synthetic resin film, addition of 0.01–3 parts by weight with respect to 100 parts by weight of the synthetic resin film are appropriate, and 0.01–1 part by weight is the most preferable. The reason is that if the added amount is less than the lower limit, the anti-blocking effect cannot be fully exhibited due to the low addition ratio and the low accuracy for uniform dispersion in the synthetic resin. On the other hand, if the added amount is more than the upper limit, the transparency of the film is spoiled and the anti-blocking property can not be improved in spite of a large amount of addition. Furthermore, the stretchability of the film becomes lower.

Methods for blending the additive particles of the present invention into the synthetic resin composition are not specifically limited, including, for example, a method of kneading particles into the synthetic resin by using a kneader. In a polyester such as PET, firstly the additive particles of the present invention is dispersed in ethylene glycol that is a raw material of the polyester, then the dispersion is added to the reaction mixture prior to an ester interexchange reaction or at a time between prior to an esterification reaction and prior to a polycondensation reaction.

The additive for synthetic resins of the present invention can be used with one or more other additives for synthetic resins, for example, polyolefins, polyesters and so on. Such additives include pigments, dyes, ultraviolet absorbers, many kinds of stabilizers, antioxidants, shading agents (for example, carbonblack, titanium oxide), processing aids, anti-static agents, anti-microbial agents, deodorants, agricultural medicines, perfumes, and so on, and these may be used singly or in combination of two or more. Since the additive for synthetic resins of the present invention has a high specific surface area and a high percentage of voids, and has a superior absorbability and a retention activity, the above additives can be used by being adsorbed to or retained to the additive particles of the present invention.

For example, as the anti-microbial agent, inorganic anti-microbial agents such as silver, copper and zinc, quaternary ammonia such as benzalkonium chloride and cetylpyridinium chloride, alcohols such as ethanol and isopropanol, aldehydes such as formaldehyde and glyoxal, phenols such as cresol and xylenol, carboxylic acids such as sorbic acid and benzoic acid, guanidines such as chlorhexyzine and n-dodecylguanidine acetate, thiazoles such as 2-mercaptobenzothiazole, and 2-methyl-4-isothiazoline-3-on can be used. As the deodrant, tannic acid, camphor oil, and turpentine oil can be used. As the agricultural medicine, dimethyl phtalate, 2-ethyl-1,3-hexanediol, indalone, dimethyl carbate, irgabirine, PCP agent (pentachlorophenol), MEP agent (dimethyl thiophosphate) and ECP agents (diethyldichlorophenyl thiophosphate) can be used. As the ultraviolet absorber, 2,4-dihydroxybenzophenone, phenylsalicylate, 2-(2'-hydroxy-5'-methyl-phenyl)-benzotriazole and 2-ethylhexyl-2-cyano-3,3-diphenylacrylate can be used. As the dye, azo dye, anthraquinone dye, indigoid dye, sulfur dye and triphenylmethane dye can be used. As the perfume, natural perfumes such as musk, abies oil, bergamot oil, boroaze oil, rosewood oil, rosemary oil and orangeflower oil, synthetic perfumes such as ethyl acetoacetate, anethole, amylcinnamic aldehyde, ethyl isovalerate and isoamyl acetate and perfume mixtures including rose group, jasmine group, lilac group and so on can be used.

An amount of addition of these additives is not specifically limited. However, 0.0001–100% by weight with respect to the additive for synthetic resins of the present invention is preferable. If necessary, other anti-blocking agents, for example, inorganic particles such as synthetic spherical silica, β, γ-alumina, aulminosilicate, synthetic zeolite, titanium oxide, kaolin, clay, talc, barium sulfate and calcium carbonate, amorphous calcium phosphate having no petaloid structure [ACP: $Ca_3(PO_4)_2 \cdot nH_2O$], fluorine apatite [FAP: $Ca_{10}(PO_4)_6F_2$], chlorine apatite [CAP: $Ca_{10}(PO_4)_6Cl_2$], hydroxyapatite [HAP: $Ca_{10}(PO_4)_6(OH)_2$], octacalcium phosphate [OCP: $Ca_8H_2(PO_4)_6 \cdot 5H_2O$], tricalcium phosphate [TCP: $Ca_3(PO_4)_2$], calcium hydrogenphosphate (DCP: $CaHPO_4$), calcium hydrogenphosphate. $2H_2O$ (DCPD: $CaHPO_4 \cdot 2H_2O$), etc. may be used singly or in combination of two or more depending on the object. Moreover, organic high molecular weight particles including silicone resin particles, cross-linked acrylic resins, polymethylmethacrylate particles, cross-linked polystyrene particles, cross-linked polyethylene particles, polyfluorocarbon particles and polyimide particles can be used conjointly with the additive of the present invention. An amount of these particles to be added is not specifically limited, however, usually, 0.01–3 parts by weight with respect to 100 parts by weight of the additive for synthetic resins of the present invention is preferable.

In order to increase the ability of dispersion and stabilization, the surface of the additive particle of the present invention can be treated, according to a conventional method, with coulpling agents such as silane coupling agents and titanate coupling agents, surface treating agents including organic acids such as fatty acids, resin acids, acrylic acid, oxalic acid, citric acid and tartaric acid, inorganic acids such as hydrofluoric acid, polymers thereof, salts thereof or esters thereof and so on, surfactants, and condensed phosphoric acids and salts thereof such as sodium hexametaphosphate, pyrophosphoric acid, sodium pyrophosphate, tripolyphosphoric acid, sodium tripolyphosphate, trimetaphosphoric acid and highpolyphosphoric acid.

Hereinafter, the present invention will be explained in greater detail by showing examples and comparative examples, which in no way limit the present invention.

EXAMPLES 1–4, COMPARATIVE EXAMPLES 1–7

Particles A–J were prepared by the method as set forth below:

The particles A–J were prepared by mixing in water an aqueous suspension dispersion of calcium carbonate and a dilute aqueous solution of phosphoric acid so that an atomic ratio Ca/P is 1.62 under specific mixing conditions as shown in Table 2 and Table 3, followed by aging under specific aging conditions as shown in Table 2 and Table 3, dehydration and drying under a drying atmosphere at 700° C. or less, then grinding.

The particle preperties of the thus prepared particles A–J and a commercially available hydroxypatite (Trade name: Tricalcium phosphate manufactured by Yoneyama Chemical Co., Ltd.) are shown in Table 1.

Figure 2:
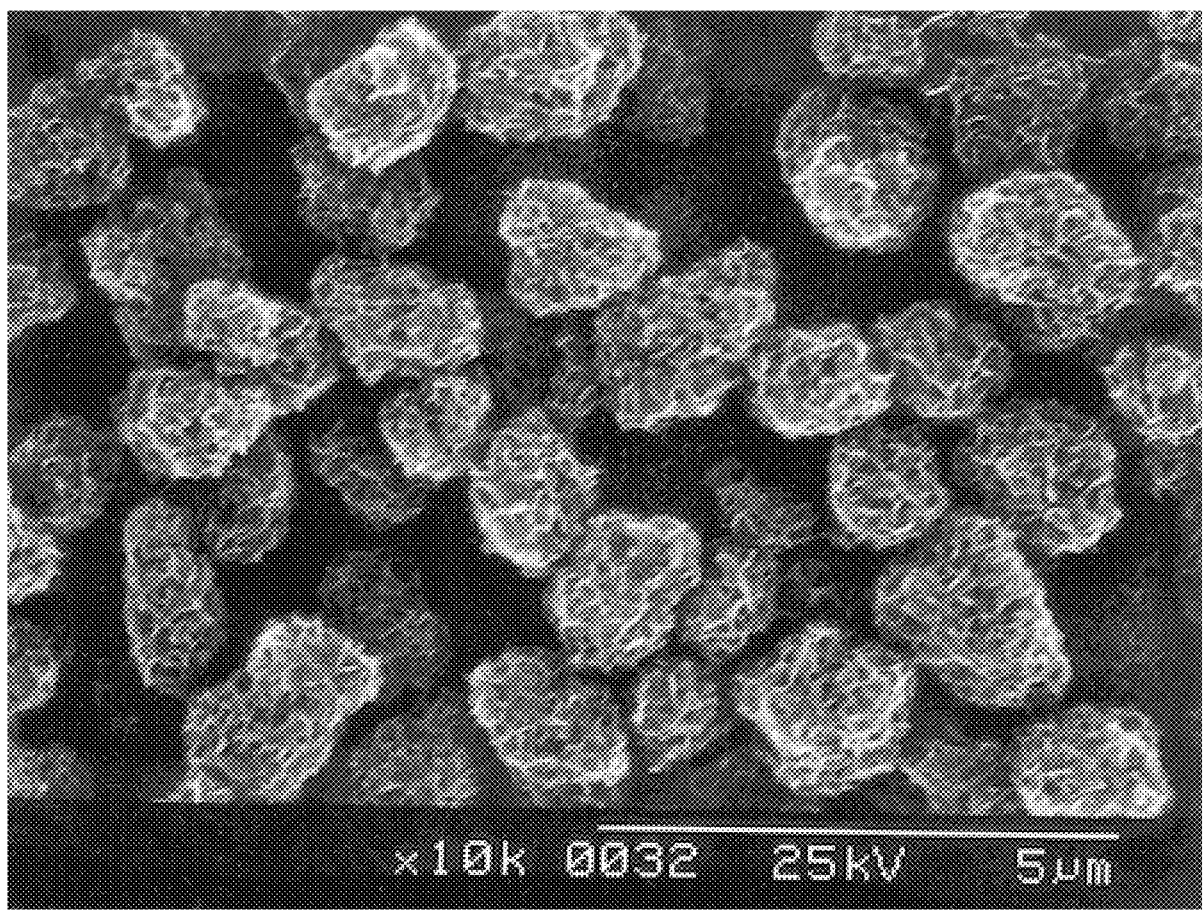
FIG. 2 is a photograph of an electron microscope (×10000 magnification) showing a particle structure of particles A.
Figure 3:
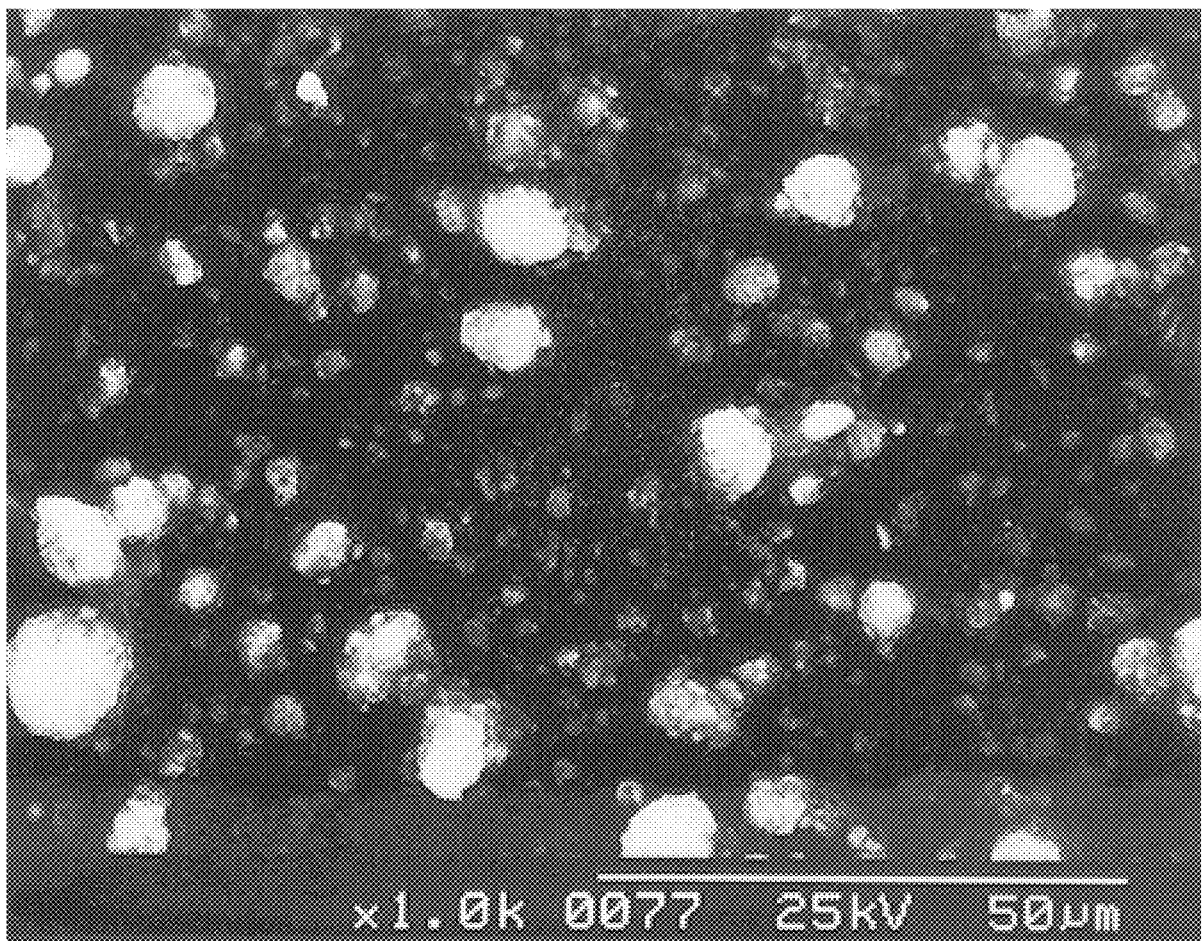
FIG. 3 is a photograph of an electron microscope (×1000 magnification) showing a particle structure of a commercially available hydroxyapatite particle.
Figure 4:
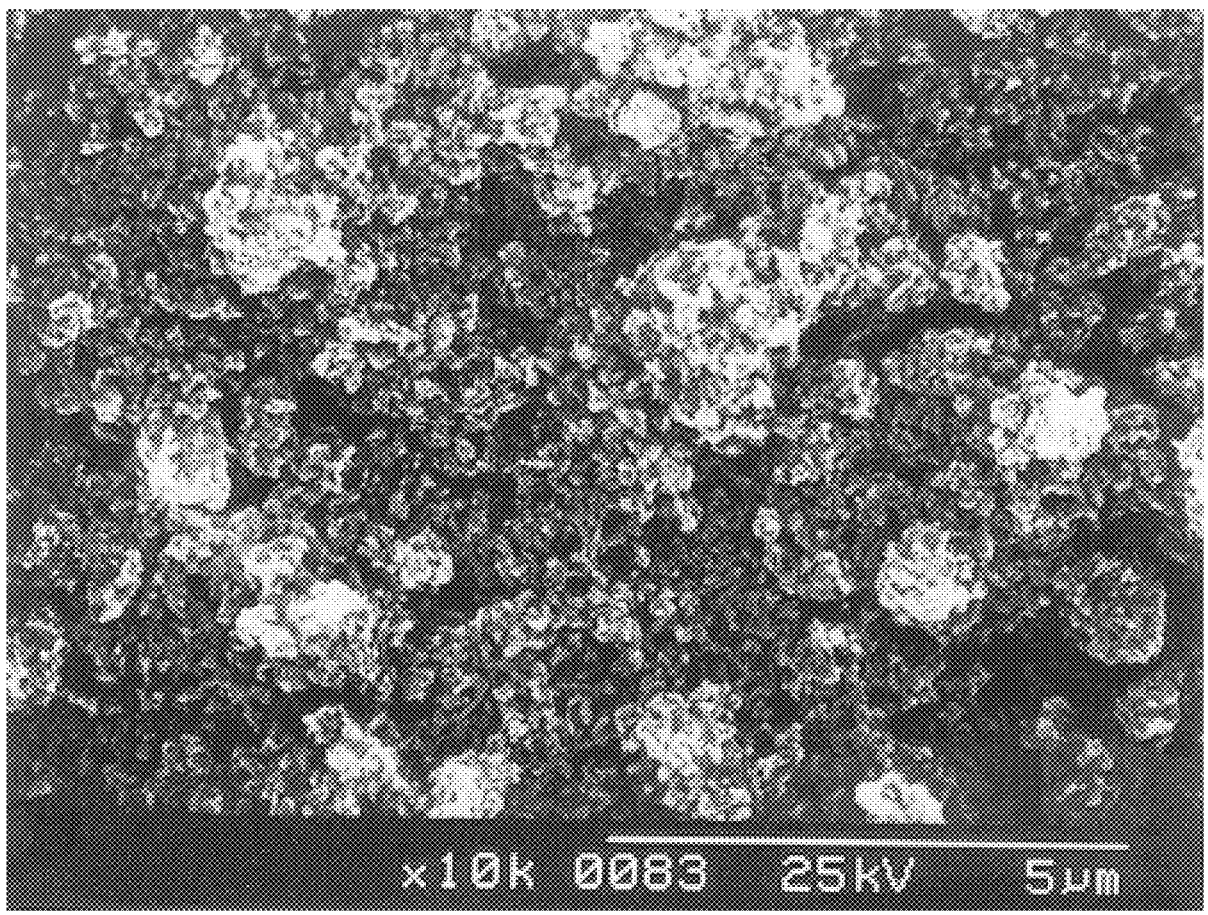
FIG. 4 is a photograph of an electron microscope (×10000 magnification) showing a particle structure of a commercially available hydroxyapatite particle.

In order to compare the surface of the particles, photographs of an electron microscope are given in FIG. 1 (×1,000 magnification), FIG. 2 (×10,000 magnification) and FIG. 3 (×1,000 magnification), FIG. 4 (×10,000 magnification), respectively.

It is understood from FIG. 1 and FIG. 2 that the particles A has a petaloid porous structure and from FIG. 3 and FIG. 4 that the commercially available hydroxyapatite is aggregates of fine particles, not having a petaloid porous structure.

TABLE 1

| | Examples | | | | Comparative Examples | | | | | | 7 Commercially available hydroxyapatite |
|---|---|---|---|---|---|---|---|---|---|---|---|
| Particles | 1 A | 2 B | 3 C | 4 D | 1 E | 2 F | 3 G | 4 H | 5 I | 6 J | |
| dx1 μm | 1.7 | 1.5 | 1.0 | 4.0 | 0.1 | 3.5 | 23.0 | 1.4 | 1.3 | 1.3 | 0.08 |
| α | 1.1 | 1.3 | 1.5 | 1.4 | 38 | 2.2 | 1.8 | 2.2 | 1.8 | 2.2 | 27 |
| β | 0.5 | 0.8 | 0.9 | 1.3 | 3.0 | 1.8 | 1.4 | 0.8 | 1.8 | 2.2 | 3.1 |
| Sw1 | 165 | 120 | 100 | 100 | 90 | 80 | 80 | 120 | 160 | 160 | 110 |
| dx2 μm | 0.02 | 0.02 | 0.02 | 0.03 | 0.02 | 0.03 | 0.4 | 0.02 | 0.02 | 0.02 | — |
| ω1 | 97 | 95 | 94 | 94 | 90 | 85 | 85 | 96 | 96 | 96 | 91 |
| ω2 | 85 | 77 | 70 | 70 | 55 | 45 | 45 | 85 | 77 | 86 | 68 |

TABLE 2

| Example | 1 | 2 | 3 | 4 |
|---|---|---|---|---|
| Solid conc. of calcium carbonate aqueous suspension (wt. %) | 5 | 10 | 5 | 10 |
| Solid conc. of dilute aqueous solution of phosphoric acid (wt. %) | 5 | 10 | 10 | 10 |
| Mixing conditions: | | | | |
| Mixing time hr | 2.0 | 2.5 | 3.0 | 1.5 |
| Temperature of aqueous suspension ° C. | 50 | 30 | 50 | 30 |
| pH of aqueous suspension | 6–6.8 | 6–6.8 | 6–6.8 | 6–6.8 |
| Peripheral speed of stirring blade m/sec | 5.0 | 5.0 | 5.0 | 1.0 |
| Aging conditions: | | | | |
| Conc. of Ca (wt. %) | 1.3 | 2.5 | 1.5 | 2.5 |
| Aging time hr | 1.0 | 1.0 | 1.0 | 5.0 |
| Temperature of aqueous suspension ° C. | 50 | 30 | 50 | 30 |
| pH of aqueous suspension | 7–8 | 7–8 | 7–8 | 7–8 |
| Peripheral speed of stirring blade m/sec | 5.0 | 5.0 | 5.0 | 1.0 |

TABLE 3

| Comparative Examples | 1 | 2 | 3 | 4 | 5 | 6 |
|---|---|---|---|---|---|---|
| Solid conc. of calcium carbonate aqueous suspension (wt. %) | 10 | 10 | 10 | 5 | 5 | 5 |
| Solid conc. of dilute aqueous solution of phosphoric acid (wt. %) | 10 | 10 | 10 | 10 | 10 | 5 |
| Mixing conditions: | | | | | | |
| Mixing time hr | 0.07 | 1.5 | 0.05 | 1.5 | 2.0 | 2.0 |
| Temperature of aqueous suspension ° C. | 35 | 50 | 30 | 50 | 30 | 25 |
| pH of aqueous suspension | 6–6.5 | 6–6.5 | 6–6.5 | 6–6.5 | 6–6.5 | 6–6.5 |
| Peripheral speed of stirring blade m/sec | 0.2 | 1.0 | 0.2 | 5.0 | 5.0 | 5.0 |
| Aging conditions: | | | | | | |
| Conc. of Ca (wt. %) | 2.5 | 2.5 | 2.5 | 1.5 | 1.5 | 1.3 |
| Aging time hr | 1.0 | 1.0 | 2.0 | 1.0 | 1.0 | 1.0 |
| Temperature of aqueous suspension ° C. | 35 | 50 | 30 | 50 | 30 | 25 |
| pH of aqueous suspension | 7–8 | 7–8 | 7–8 | 7–8 | 7–8 | 7–8 |
| Peripheral speed of stirring blade m/sec | 0.2 | 0.2 | 0.3 | 0.2 | 0.2 | 0.1 |

EXAMPLES 5, 6 AND COMPARATIVE EXAMPLES 8–17

Using the particles B and D for Examples 5 and 6, the particles E–J, a commercially available hydroxyapatite (Trade name: Tricalcium phosphate manufactured by Yoneyama Chemical Co., Ltd.), a commercially available A-type zeolite (Trade name: Synthetic A-type zeolite manufactured by Mizusawa Chemical Co., Ltd.), a commercially available synthetic silica (Trade name: AEROSIL manufactured by Nippon Aerosil Co., Ltd.) for Comparative Examples 8–16, and using no particles as a control for Comparative Example 17, polypropylene compositions were prepared by the method as set forth below, and biaxially oriented polypropylene films were obtained, the quality of the films being evaluated. The results are shown in Table 4. Preparation of polyolefin films:

To 100 parts by weight of polypropylene having a melt flow rate of 1.9 g/10 min., 0.10 part by weight of 2,6-di-t-butyl-p-cresol and 0.02 part by weight of Irganox 1010 (Registered trade mark of Chiba Geigy) as an antioxidant, 0.05 part by weight of calcium stearate as a hydrochloric acid catcher and each of additives for synthetic resins were added, mixed with Super mixer, and pelletized by an extruder.

The obtained pellets were formed into a sheet film by the use of an extruder and the obtained film was drawn 5 times to the longitudinal direction and 10 times to the lateral direction, and consequently, a stretched film of 30 μm thickness was obtained.

On one side of the stretched film thus obtained, corona discharge treatment was carried out.

The biaxially oriented film thus obtained was measured with respect to transparency, anti-blocking property and anti-scratch property. The transparency of the film was measured by using 4 sheets of films piled up according to ASTM-D-1003. The anti-blocking property of the film was measured as follows: two sheets of films were piled one upon another so that the contacting area is 10 cm$^2$, the layered films were put between two glass plates, a 50 g/cm$^2$ load was added to the films and left for 7 days at 40° C., the layered films were pulled apart at a rate of 500 mm/min. by using Schopper tensile tester and the maximum load value was obtained. The smaller the value becomes, the better the anti-blocking property becomes. The anti-scratch test was done as follows: one biaxially oriented film was fixed on a glass plate, another biaxially oriented film was fixed on a box-type container having the contacting area of 50 cm$^2$, these two films were scratched 6 times with a load of 4 kg, and a value of transparency was measured before and after scratching. The smaller the value becomes, the better the anti-scratch property becomes.

TABLE 4

| Examples or Comp. Examples | Additives for synthetic resins | | Quality of films | | |
|---|---|---|---|---|---|
| | Particles | Amount added parts by wt.* | Transparency % | Anti-blocking property g/10 cm$^2$ | Anti-scratch property |
| Example 5 | B | 0.08 | 9.4 | 22 | 3.3 |
| Example 6 | D | 0.06 | 6.7 | 45 | 4.5 |
| Comp. Ex. 8 | E | 0.04 | 9.2 | 1200 | 6.1 |
| Comp. Ex. 9 | F | 0.04 | 8.4 | 950 | 6.4 |
| Comp. Ex. 10 | G | 0.04 | 11.0 | 420 | 10.0 |
| Comp. Ex. 11 | H | 0.08 | 9.4 | 150 | 7.4 |
| Comp. Ex. 12 | I | 0.08 | 9.4 | 160 | 7.4 |
| Comp. Ex. 13 | J | 0.08 | 9.5 | 180 | 7.7 |
| Comp. Ex. 14 | Hydroxyapatite | 0.04 | 12.5 | 1250 | 7.0 |
| Comp. Ex. 15 | A-type zeolite | 0.08 | 14.6 | 120 | 6.7 |
| Comp. Ex. 16 | Synthetic silica | 0.15 | 13.7 | 1050 | 5.1 |
| Comp. Ex. 17 | Blank | — | 2.0 | 2400 | 1.0 |

*Parts by wt. to 100 parts by wt. of polypropylene resin

EXAMPLES 7, 8 AND COMPARATIVE EXAMPLES 18–24

Ethylene glycol slurries of containing particles A and C for Examples 7 and 8, particles E and F for Comparative Examples 18 and 19, particles H–J for Comparative Examples 20–22, and the commercially available A-type zeolite and synthetic silica for Comparative Examples 23 and 24 were added prior to a polyesterification, followed by a polyesterification reaction, to thus obtain polyethyleneterephthalates containing 0.1% by weight of the particles and having a limiting viscosity number (orthochlorophenol, 35° C.) of 0.62 dl/g. The polyethyl eneterephthalates were dried at 160° C., followed by a melt extrusion at 290° C., rapidly cooled and solidified on a casting drum having a temperature maintained at 40° C., thereby obtaining unstretched films. The thus obtained unstretched films were pre-heated at 70° C. by a heating roller, stretched 3.6 times to the longitudinal direction while heating with an infrared heater, and then stretched 4.0 times to the lateral direction at 90° C., followed by heat treatment at 200° C. Thus, biaxially oriented films having a thickness of 15 μm were obtained.

The quality of the thus obtained films was evaluated according to the following methods. The results are shown in Table 5.

① Surface Roughness of the Film(Ra)

The surface roughness of the film is a value defined as a center line average height (Ra) of JIS-B0601. In the present invention, a tracer type surface roughness tester of Kosaka Kenkyusho Co., Ltd., (SURFCORDER SF-30C) was used to measure the center line average height. Measuring conditions are as follows:

(a) Radius of a head of the tracer: 2 μm,
(b) Measuring pressure: 30 mg,
(c) Cut off: 0.25 mm,
(d) Length for measurement: 0.5 mm, and
(e) An average value is calculated from 4 data obtained by excluding the highest value from 5 repeated values on the same sample.

② Friction Coefficient of the Film ($\mu k$)

Figure 5:
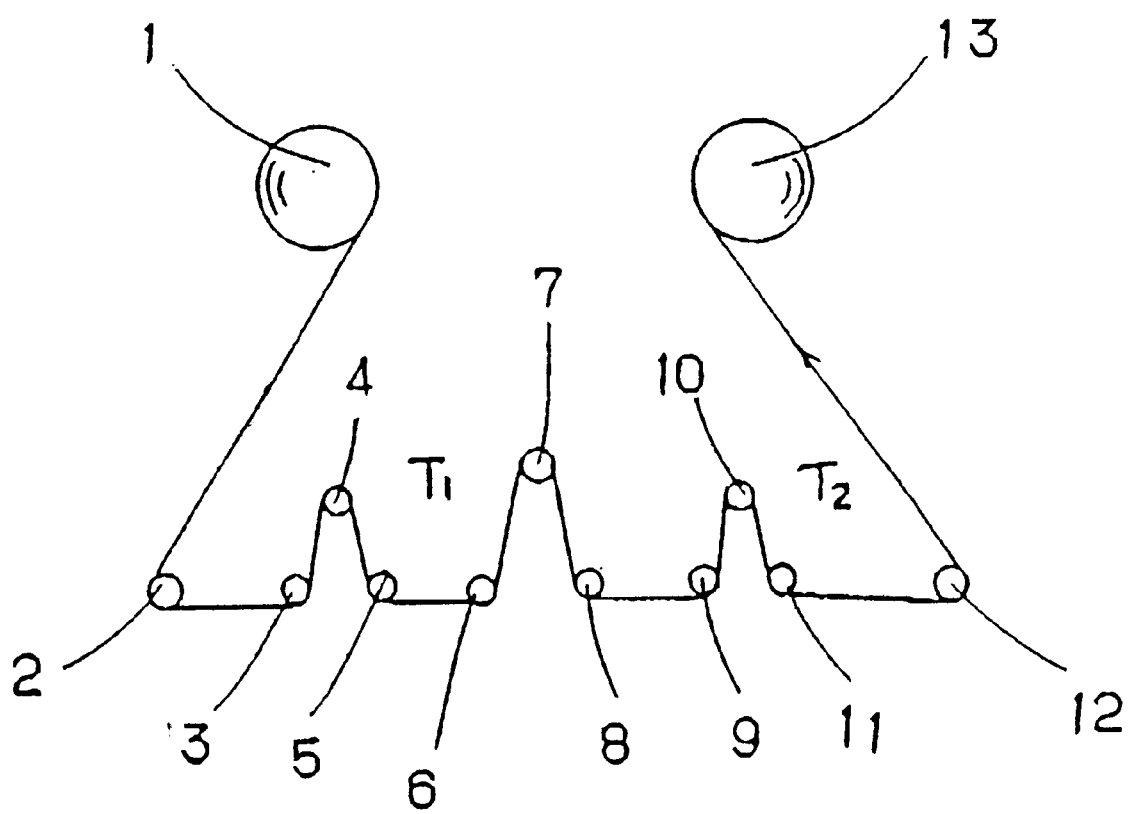
FIG. 5 is a schematic representation of an apparatus for measuring a friction coefficient of a film.

The friction coefficient is measured by using an appratus shown in FIG. 5. In FIG. 5, each number shows parts of the apparatus, respectively, as follows: 1: unwinding reel; 2: tension controller; 3,5,6,8,9 and 11: free roller; 4: tension detector (inlet); 7: fixing bar (outer diameter:5 mm) made of stainless steel net, SUS304; 10: tension detector (outlet); 12: guide roller; and 13: winding reel.

Under conditions of a temperature of 20° C. and a humidity of 60%, a cutted film of ½ inch width was contacted with the fixing bar 7 (surface roughness: 0.3 μm) at an angle of θ=(152/180)π radian (152°) and moved (frictioned) at a rate of 200 cm per min. When the tension controller is adjusted so that the inlet tention T1 is 35 g, the outlet tention (T2:g) is detected by the outlet tension detector after 90 meter run of the film. The traveling friction coefficient $\mu k$ is caluculated from the following equation:

$$\mu k=(2.303/\theta)\log(T2/T1)=0.86 \log(T2/35)$$

③ Evaluation of Abrasion-I

A surface of the film of ½ inch width is contacted with a stainless steel fixing pin (surface roughness 0.58 μm) having a diameter 5 mm at an angle of 150°, and the fixing pin is moved and frictioned reciprocally about 15 cm intervals at a rate of 2 meters per minute. In this case, the inlet tension T1 is 60 g.

The above operations are repeated, and after 40 reciprocal movements, degree of scratches raised on the surface of the film is visually examined. The four-rank evaluation of the scratches is made according to the criteria: A: Scratches are scarcely found; B: A few scratches are found; D: Scratches are found all over the surface; and C: Intermediate of B and D.

④ Evaluation of Abrasion-II

Shavingness of the running surface of the film is evaluated by using a 5 layered minisuper calender. The calendar is 5 layered of Nylon rolls and steel rolls. A treatment temperature is 80° C. and a linear load on the film is 200 kg/cm. A film speed is 50 meters/min. After running film 4000 meters in total, the shavingness of the film is evaluated by smudge adhered to the top roll of the calender.

<Four-rank Evaluation>

A: No smudge on the roll
B: Little smudge on the roll
C: Smudge on the roll; and
D: Noticeable smudge on the roll.

⑤ Number of Coarse Protrusions on the Film Surface

After aluminum is thinly vapor deposited on the film surface, the number of coarse protrusions with 4 or more quartet circles (number per 1 $mm^2$ of the measuring area) is counted by using a binary beam interference microscope, and ranked according to the number of the coarse protrusions:

1st class: not less than 16; 2nd class: 12–15; 3rd class: 8–11; 4th class: 4–7; and 5th class: 0–3

TABLE 5

|  | Examples |  |  |  |  |  |  | Comparative Examples |  |
|---|---|---|---|---|---|---|---|---|---|
|  |  |  |  |  |  |  |  | 23 | 24 |
| Particles | 7<br>A | 8<br>C | 18<br>E | 19<br>F | 20<br>H | 21<br>I | 22<br>J | A-type<br>zeolite | Synthetic<br>silica |
| Surface roughness Ra μm | 0.021 | 0.020 | 0.025 | 0.029 | 0.027 | 0.028 | 0.029 | 0.022 | 0.020 |
| Friction coefficient μk | 0.38 | 0.40 | 0.37 | 0.38 | 0.38 | 0.37 | 0.38 | 0.38 | 0.38 |
| Abrasion- I | A | B | D | D | D | D | D | D | C |
| Abrasion- II | A | B | C | C | C | C | C | D | C |
| Coarse protrusions | 5th class | 5th class | 2nd class | 3rd class | 3rd class | 3rd class | 3rd class | 1st class | 4th class |

EXAMPLES 9, 10 AND COMPARATIVE EXAMPLES 25, 26

Using particles A and C for Examples 9 and 10 and A-type zeolite and synthetic silica for Comparative Examples 25 and 26, polyester fibers were prepared by the method as set forth below. Three fibers were bundled to give multifilaments, respectively and knitted fabrics were obtained by a circular interlock knitting machine, then subjected to scouring and drying. The knitted fabrics were then subjected to dyeing by the use of Diamix Black BG-FS 13% owf at a liquor ratio of 1:30 at 130° C. for 60 minutes, followed by reduction cleaning and drying to thus obtain black textile fabrics. The dyeability of the thus obtained textile fabrics was evaluated by the method as set forth below. The evaluation results are shown in Table 6.

Preparation of Polyester Fibers:

To dimethyl terephthalate and ethylene glycol as raw materials, the particles were added in an amount of 3% by weight with respect to polyester and subjected to polymerization by a conventional method to thus obtain polyethyleneterephthalates in the form of tips. The dispersibility of the particles in polyesters were found good. These polyesters were subjected to spinning by an extrusion molding machine at 290° C. and the obtained unstretched fibers were subjected to two-step stretching 3 times in water of 75° C. and 96° C. to thus give polyester fibers.

Evaluation method of dyeability:

① Evaluation of Color Development

An L value of the textile fabrics was measured by a digital color difference calculator. The smaller the L value becomes, the deeper the color becomes.

② Evaluation of Discoloration Caused by Washing and Dry Cleaning

The treatment was repeated three times according to JIS L0844 and L0860 and a change in color compared with the textile fabric was ranked by the use of a gray scale provided in JIS L0804. As the ranks become close to 5, the change in color is small.

TABLE 6

| | Particles | Color development L values | Change in color Washing | DC* |
|---|---|---|---|---|
| Example 9 | A | 12.9 | 4–5 | 4–5 |
| Example 10 | C | 13.0 | 4 | 4 |
| Example 25 | A-type zeolite | 14.2 | 3 | 3 |
| Example 26 | Synthetic silica | 15.0 | 3 | 3 |

*Dry cleaning

Industrial Applicability

As stated above, by using an additive for synthetic resins of the present invention, a synthetic resin composition having good properties can be prepared. For example, when the additive is used in a polyolefin film, the polyolefin film having good anti-blocking property, goo transparency and good anti-scratch property can be obtained. Moreover, when the additive is used in a polyester, a good polyester film having good slipperiness, good anti-abrasion and less coarse protrusions or a polyester fiber having good dyeability can be obtained.

What is claimed is:

1. An additive for synthetic resins which comprises particles of petaloid porous hydroxyapatite represented by a chemical formula $Ca_{10}(PO_4)_6(OH)_2$, said particles satisfying the following formulas (a)–(d):

$$0.1 \leq dx1 \leq 20(\mu m) \quad (a)$$

$$1 \leq \alpha \leq 2, \text{ where } \alpha = d50/dx1 \quad (b)$$

$$0 \leq \beta \leq 1.7, \text{ where } \beta = (d90-d10)/d50, \quad (c)$$

and $$50 \leq Sw1 \leq 400 \quad (d)$$

wherein,
- dx1: Average particle diameter ($\mu$m) measured by a photograph of an electron microscope;
- $\alpha$: Dispersion coefficient;
- d50: 50% average particle diameter ($\mu$m) measured by a particle size distribution tester using a microtrack FRA laser;
- $\beta$: Sharpness;
- d90: 90% particle diameter of the total particles passed through a sieve measured by a particle size distribution tester using a microtrack FRA laser;
- d10: 10% particle diameter of the total particles passed through a sieve measured by a particle size distribution tester using a microtrack FRA laser;
- Sw1: BET specific surface area $m^2/g$ by a nitrogen adsorbing method.

2. The additive for synthetic resins of claim 1, wherein the particles have the average particle diameter dx1 satisfying the following formula (e):

$$0.2 \leq dx1 \leq 10(\mu m). \quad (e)$$

3. The additive for synthetic resins of claim 2, wherein the particles have the average particle diameter dx1 satisfying the following formula (f):

$$0.5 \leq dx1 \leq 8(\mu m). \quad (f)$$

4. The additive for synthetic resins of any one of claims 1 to 3, wherein the particles have the dispersion coefficient $\alpha$ and the sharpness $\beta$ both satisfying the following formulas (g) and (h), respectively:

$$1 \leq \alpha \leq 1.5; \quad (g)$$

and $$0 \leq \beta \leq 1.0. \quad (h)$$

5. The additive for synthetic resins of any one of claims 1 to 3, wherein the particles have the BET specific surface area Sw1 satisfying the following formula (i):

$$100 \leq Sw1 \leq 350. \quad (i)$$

6. The additive for synthetic resins of any one of claims 1 to 3, wherein the particles satisfy the following formulas (j)–(l):

$$0.01 \leq dx2 \leq 1(\mu m); \quad (j)$$

$$90 \leq \omega 1 \leq 99, \quad (k)$$

and $$60 \leq \omega 2 \leq 95 \quad (l)$$

wherein,
- dx2: Average micropore diameter ($\mu$m) of particles measured from a distribution of the micropore measured by a mercury penetration method;
- $\omega 1$: Static percentage of voids (%) calculated from the following equation (m):

$$\omega 1 = \left\{ 1 - \frac{1}{2.9 \times [\text{apparent specific volume}]} \right\} \times 100(\%) \quad (m)$$

wherein the apparent specific volume (ml/g) is measured according to a static method of pigment test according to JIS K5101-91 20.1,

- $\omega 2$: Pressurized percentage of voids (%) calculated from the following equation (n):

$$\omega 2 = \left\{ 1 - \frac{0.5}{2.9 \times 2 \times [\text{thickness}]} \right\} \times 100(\%) \quad (n)$$

wherein the thickness is measured by a slide calipers after packing 0.5 g of a sample in a cylinder having a cross section of 2 $cm^2$, pressurizing the sample with a pressure of 30 $kg/cm^2$ for 30 seconds.

7. The additive for synthetic resins of any one of claims 1 to 3, wherein the particles satisfy the following formulas (o) and (p);

$$95 \leq \omega 1 \leq 99, \quad (o)$$

and $$70 \leq \omega 2 \leq 95. \quad (p)$$

8. A synthetic resin composition which comprises blending a synthetic resin with an additive described in any one of claims 1–3.

9. The synthetic resin composition of claim 8, wherein the synthetic resin composition is a synthetic resin fiber or a synthetic resin film.

* * * * *